United States Patent
Diorio et al.

(10) Patent No.: US 9,024,731 B1
(45) Date of Patent: May 5, 2015

(54) RFID TAGS AND READERS EMPLOYING QT COMMAND TO SWITCH TAG PROFILES

(71) Applicants: Christopher J. Diorio, Shoreline, WA (US); Theron Stanford, Seattle, WA (US); Scott A. Cooper, Seattle, WA (US); Harley K. Heinrich, Snohomish, WA (US); Chad A. Lindhorst, Seattle, WA (US); Kambiz Rahimi, Bellevue, WA (US)

(72) Inventors: Christopher J. Diorio, Shoreline, WA (US); Theron Stanford, Seattle, WA (US); Scott A. Cooper, Seattle, WA (US); Harley K. Heinrich, Snohomish, WA (US); Chad A. Lindhorst, Seattle, WA (US); Kambiz Rahimi, Bellevue, WA (US)

(73) Assignee: Impinj, Inc., Seattle, WA (US)

( * ) Notice: Subject to any disclaimer, the term of this patent is extended or adjusted under 35 U.S.C. 154(b) by 178 days.

(21) Appl. No.: 13/900,443

(22) Filed: May 22, 2013

Related U.S. Application Data

(63) Continuation of application No. 12/838,612, filed on Jul. 19, 2010, now Pat. No. 8,471,708.

(60) Provisional application No. 61/306,804, filed on Feb. 22, 2010.

(51) Int. Cl.
| | | |
|---|---|---|
| *H04Q 5/22* | (2006.01) | |
| *G06K 7/10* | (2006.01) | |
| *G08B 13/14* | (2006.01) | |
| *G08B 13/00* | (2006.01) | |
| *G06Q 30/00* | (2012.01) | |
| *A01K 5/02* | (2006.01) | |
| *H04M 11/04* | (2006.01) | |

(52) U.S. Cl.
CPC .................................. *G06K 7/10297* (2013.01)

(58) Field of Classification Search
USPC ............ 340/10.51, 10.42, 10.2, 572.8, 573.1; 705/26.3, 28; 455/404.2
See application file for complete search history.

(56) References Cited

U.S. PATENT DOCUMENTS

| | | | | |
|---|---|---|---|---|
| 6,081,789 | A * | 6/2000 | Purcell | 705/37 |
| 6,778,096 | B1 * | 8/2004 | Ward et al. | 713/1 |
| 7,397,381 | B2 * | 7/2008 | DiPiazza | 340/573.1 |
| 7,979,050 | B2 * | 7/2011 | Katoh et al. | 455/404.2 |
| 8,284,031 | B2 * | 10/2012 | Moshfeghi | 340/10.2 |
| 2005/0030160 | A1 * | 2/2005 | Goren et al. | 340/10.5 |
| 2005/0093702 | A1 * | 5/2005 | Twitchell, Jr. | 340/572.8 |
| 2007/0150383 | A1 * | 6/2007 | Shakes et al. | 705/29 |
| 2008/0120200 | A1 * | 5/2008 | Hurtis et al. | 705/28 |

* cited by examiner

*Primary Examiner* — Jack K Wang
(74) *Attorney, Agent, or Firm* — Turk IP Law, LLC

(57) ABSTRACT

RFID readers transmit a Quiet Technology (QT) command to RFID tags causing at least one of the tags to transition between a private profile and a public profile. When a tag is inventoried in the private profile, it replies to the reader with contents from its private memory. When a tag is inventoried in the public profile, it replies to the reader with contents from its public memory, where the contents of the public memory may be a subset and/or modified version of the private memory contents, or entirely different altogether. The tag's profile can be switched again by another QT command from the reader, or following a loss of power at the tag. An access password and/or a short-range mechanism may be employed to allow only authorized readers to transition tag profiles or interrogate the private memory contents of tags in the public profile.

24 Claims, 16 Drawing Sheets

ARCHITECTURE

SIGNAL PATH DURING R→T

SIGNAL PATH DURING T→R

EXAMPLE PRIVATE PROFILE

SWITCHING EXPOSED MEMORY
FROM PRIVATE TO PUBLIC, AND
VICE VERSA

FIG. 12　　　　　　　　　　　　　*TAG STATE DIAGRAM*

| QT Command | Code | Read/Write | Persistence | RFU | Payload | RN | CRC-16 |
|---|---|---|---|---|---|---|---|
| #bits | 16 | 1 | 1 | 2 | 16 | 16 | 16 |
| Details | 1110000000000000 | 0: Read<br>1: Write | 0: Temporary<br>1: Permanent | 00<sub>b</sub> | QT Control | handle | |

1302, 1303, 1304, 1305, 1306, 1307, 1308

*EXAMPLE QT COMMAND*

*EXAMPLE TAG RESPONSE TO QT READ COMMAND*

1410

*EXAMPLE TAG RESPONSE TO QT WRITE COMMAND*

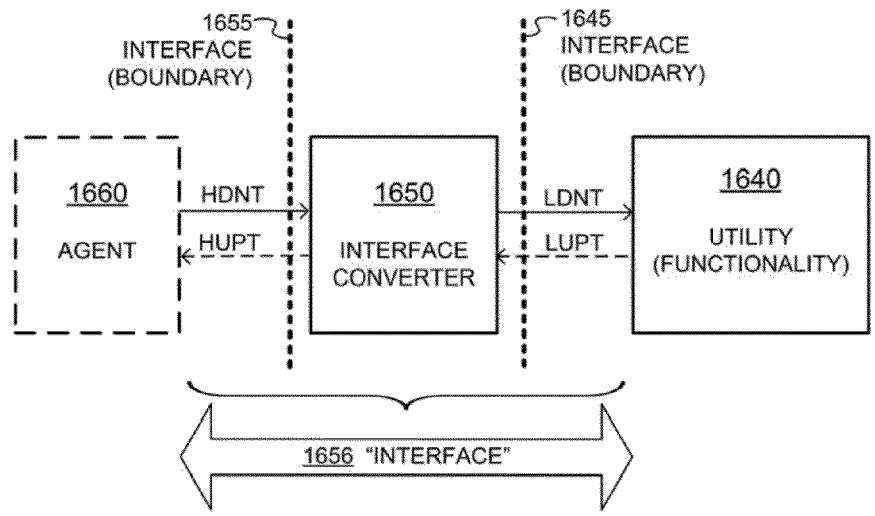
FIG. 16  ARCHITECTURE OF INTERFACE CONVERTER WITH AGENT AND UTILITY
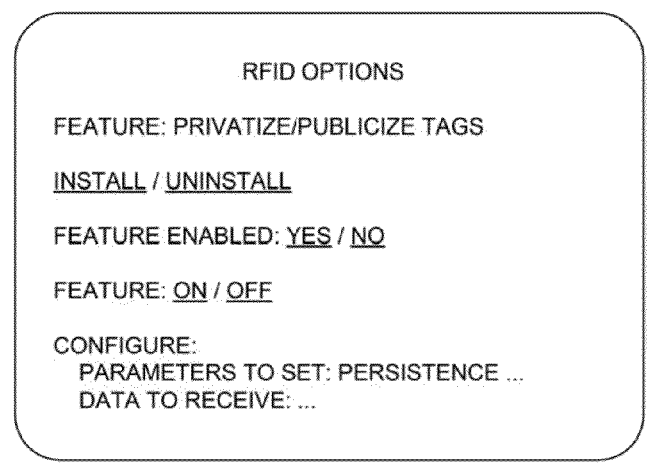
FIG. 17  SAMPLE SCREENSHOT OF INTERFACE CONVERTER EXPOSING TO AGENT OPTIONS TO CONTROL QT FUNCTIONALITY

RFID TAGS AND READERS EMPLOYING QT COMMAND TO SWITCH TAG PROFILES

CROSS REFERENCE TO RELATED APPLICATIONS

This application is a continuation of U.S. patent application Ser. No. 12/838,612 filed on Jul. 19, 2010. The disclosures of both applications are hereby incorporated by reference for all purposes.

This application claims the benefit of U.S. Provisional Patent Application Ser. No. 61/306,804 filed on Feb. 22, 2010 and U.S. Non-Provisional application Ser. No. 12/838,612 filed on Jul. 19, 2010. The disclosures of the provisional patent application are hereby incorporated by reference for all purposes.

BACKGROUND

Radio Frequency Identification (RFID) systems typically include RFID tags and RFID readers. RFID readers are also known as RFID reader/writers or RFID interrogators. RFID systems can be used in many ways for locating and identifying objects to which the tags are attached. RFID systems are particularly useful in product-related and service-related industries for tracking objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. The RF wave is typically electromagnetic, at least in the far field. The RF wave can also be predominantly electric or magnetic in the near field.

A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna section, a radio section, a power management section, and frequently a logical section, a memory, or both. In some RFID tags the power management section includes an energy storage device, such as a battery. RFID tags with an energy storage device are known as active or battery-assisted tags. Advances in semiconductor technology have miniaturized the electronics so much that an RFID tag can be powered solely by the RF signal it receives. Such RFID tags do not include an energy storage device such as a battery, and are called passive tags. Regardless of the type, all tags typically store or buffer some energy temporarily in passive storage devices such as capacitors.

Tags are sometimes removed from tagged items, such as at point-of-sale or when the item is removed from its tagged packaging. Tags sometimes remain on tagged items, for future uses such as item returns to a store or in tagged identity cards. In some cases, especially when the tag remains on the item, the owner of the item may not want unauthorized readers to be able to read or track the item, such as for privacy reasons. Most conventional tags are always capable of being inventoried; those that inhibit regular inventory typically require a password-based challenge-response authentication with a reader before allowing themselves to be inventoried. The former tag types pose privacy risks to their owners; the latter tag types require complex password-based authentication that adds complexity to the reader and to the tag and makes it difficult to use the tags unless the interrogating reader has knowledge of both the authentication algorithm and the tag's secret password.

BRIEF SUMMARY

This summary introduces a selection of concepts in a simplified form that are further described below in the Detailed Description. This summary is not intended to identify key features or essential features of the claimed subject matter, nor is it intended as an aid in determining the scope of the claimed subject matter.

Embodiments are directed to a Quiet Technology (QT) command transmitted from an RFID reader to one or more RFID tags, causing at least one of the tags to transition between exposing a private profile and a public profile, or vice versa. When a tag in the private profile is inventoried, it replies to the reader with contents from its private memory. When a tag in the public profile is inventoried, it replies to the reader with contents from its public memory. The private and public memory contents may be different and completely distinct, or one may be a subset and/or modified version of the other. The tag may also switch profiles in response to subsequent QT commands, or in some cases after a predefined period of time or upon loss of power to the tag. According to some embodiments, a tag may employ password protection to only accept QT commands from authorized readers. According to some embodiments, a tag may employ range reduction whereby the tag only accepts QT commands from readers that are physically close to the tag. According to yet other embodiments, a tag may employ password protection and range reduction.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description section proceeds with reference to the accompanying drawings, in which:

FIG. 13 illustrates QT command details.

FIG. 16 is a block diagram illustrating an architecture for an interface converter according to embodiments.

FIG. 17 is a sample screenshot of an interface converter such as the interface converter of FIG. 16, according to an embodiment.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Figure 1:
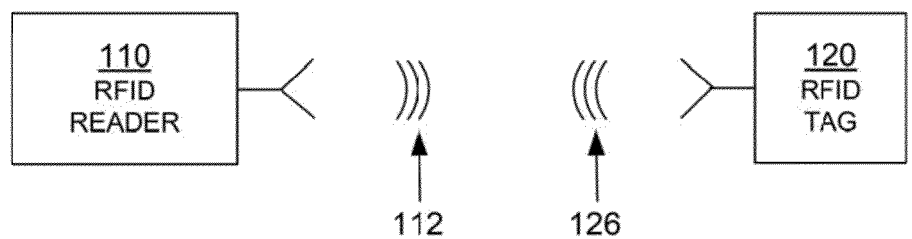
FIG. 1 is a block diagram of components of an RFID system.

FIG. 1 is a diagram of components of a typical RFID system 100, incorporating embodiments. An RFID reader 110 transmits an interrogating Radio Frequency (RF) wave 112. RFID tag 120 in the vicinity of RFID reader 110 may sense interrogating RF wave 112 and generate wave 126 in response. RFID reader 110 senses and interprets wave 126.

Reader 110 and tag 120 exchange data via wave 112 and wave 126. In a session of such an exchange each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 2.4 GHz, and so on.

Encoding the data can be performed in a number of ways. For example, protocols are devised to communicate in terms of symbols, also called RFID symbols. A symbol for communicating can be a delimiter, a calibration symbol, and so on. Further symbols can be implemented for ultimately exchanging binary data, such as "0" and "1", if that is desired. In turn, when the symbols are processed internally by reader 110 and tag 120, they can be equivalently considered and treated as numbers having corresponding values, and so on.

Tag 120 can be a passive tag, or an active or battery-assisted tag (i.e., having its own power source). Where tag 120 is a passive tag, it is powered from wave 112.

Figure 2:
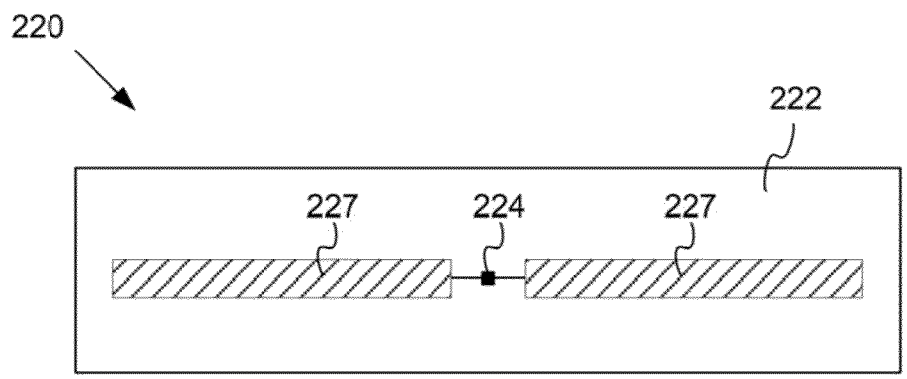
FIG. 2 is a diagram showing components of a passive RFID tag, such as a tag that can be used in the system of FIG. 1.

FIG. 2 is a diagram of an RFID tag 220, which can be the same as tag 120 of FIG. 1. Tag 220 is implemented as a passive tag, meaning it does not have its own power source. Much of what is described in this document, however, applies also to active and battery-assisted tags.

Tag 220 is typically formed on a substantially planar inlay 222, which can be made in many ways known in the art. Tag 220 includes an electrical circuit which is preferably implemented as an IC 224. IC 224 is arranged on inlay 222.

Tag 220 also includes an antenna for exchanging wireless signals with its environment. The antenna is often flat and attached to inlay 222. IC 224 is electrically coupled to the antenna via suitable antenna terminals (not shown in FIG. 2).

The antenna may be made in a number of ways. In the example of FIG. 2, the antenna is made from two distinct antenna segments 227, which are shown here forming a dipole. Many other embodiments are possible, using any number of antenna segments. In some embodiments, an antenna can be made with even a single segment. Different points of the segment can be coupled to one or more of the antenna terminals of IC 224. For example, the antenna can form a single loop, with its ends coupled to the terminals. It should be remembered that even a single segment could behave like multiple segments at the frequencies of RFID wireless communication.

In operation, a signal is received by the antenna and communicated to IC 224. IC 224 both harvests power, and responds if appropriate, based on the incoming signal and the IC's internal state. In order to respond by replying, IC 224 modulates the reflectance of the antenna, which generates backscatter 126 from wave 112 transmitted by the reader. Coupling together and uncoupling the antenna terminals of IC 224 can modulate the antenna's reflectance, as can a variety of other means.

In the embodiment of FIG. 2, antenna segments 227 are separate from IC 224. In other embodiments, antenna segments may alternatively be formed on IC 224, and so on. Furthermore, an interface element may be used to couple the IC 224 to the antenna segments 227 (not shown in FIG. 2).

The components of the RFID system of FIG. 1 may communicate with each other in any number of modes. One such mode is called full duplex. Another such mode is called half-duplex, and is described below.

Figure 3:
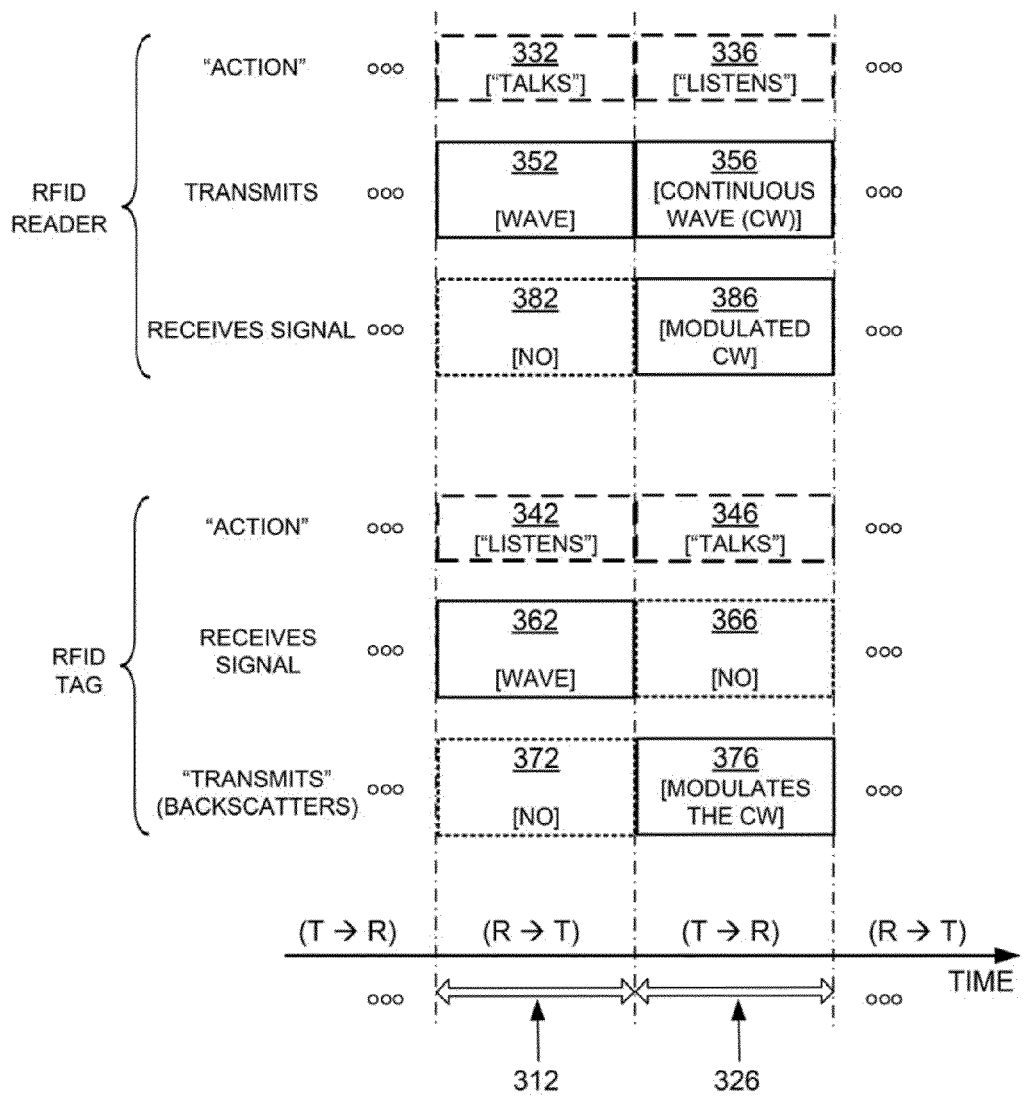
FIG. 3 is a conceptual diagram for explaining a half-duplex mode of communication between the components of the RFID system of FIG. 1.

FIG. 3 is a conceptual diagram 300 for explaining the half-duplex mode of communication between the components of the RFID system of FIG. 1, especially when tag 120 is implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R T", and when tag 120 talks to reader 110 the communication session is designated as "T R". Along the TIME axis, a sample R T communication session occurs during a time interval 312, and a following sample T R communication session occurs during a time interval 326. Of course interval 312 is typically of a different duration than interval 326— here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual technical behavior, during interval 312, reader 110 talks to tag 120 as follows. According to block 352, reader 110 transmits wave 112, which was first described in FIG. 1. At the same time, according to block 362, tag 120 receives wave 112 and processes it, to extract data and so on. Meanwhile, according to block 372, tag 120 does not backscatter with its antenna, and according to block 382, reader 110 has no wave to receive from tag 120.

During interval 326, tag 120 talks to reader 110 as follows. According to block 356, reader 110 transmits a Continuous Wave (CW), which can be thought of as a carrier signal that ideally encodes no information. As discussed before, this carrier signal serves both to be harvested by tag 120 for its own internal power needs, and also as a wave that tag 120 can backscatter. Indeed, during interval 326, according to block 366, tag 120 does not receive a signal for processing. Instead, according to block 376, tag 120 modulates the CW emitted according to block 356, so as to generate backscatter wave 126. Concurrently, according to block 386, reader 110 receives backscatter wave 126 and processes it.

Figure 4:
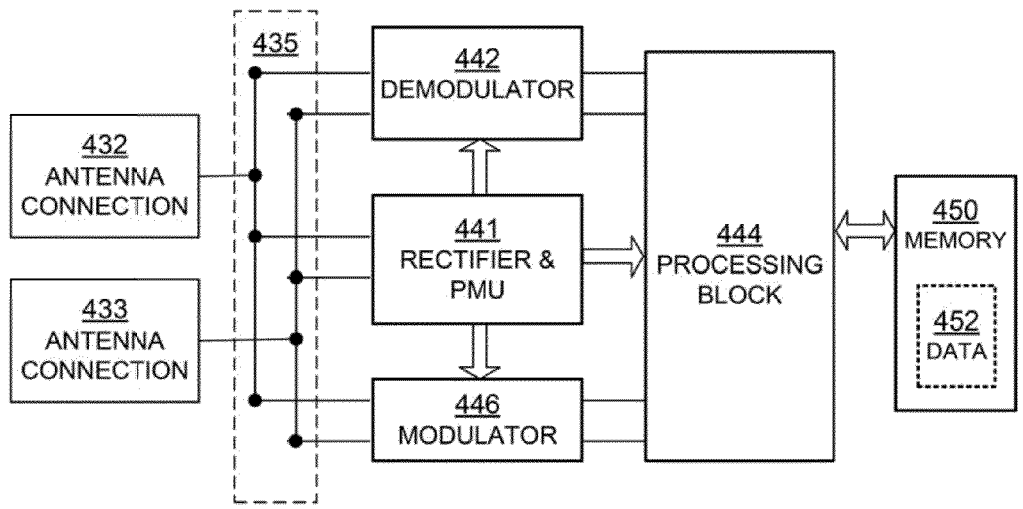
FIG. 4 is a block diagram showing a detail of an RFID tag, such as the one shown in FIG. 1.

FIG. 4 is a block diagram showing a detail of an RFID IC, such as the one shown in FIG. 2. Electrical circuit 424 in FIG. 4 may be formed in an IC of an RFID tag, such as IC 224 of FIG. 2. Circuit 424 has a number of main components that are described in this document. Circuit 424 may have a number of additional components from what is shown and described, or different components, depending on the exact implementation.

Circuit 424 includes at least two antenna connections 432, 433, which are suitable for coupling to one or more antenna segments (not shown in FIG. 4). Antenna connections 432, 433 may be made in any suitable way, such as using pads and so on. In a number of embodiments more than two antenna connections are used, especially in embodiments where more antenna segments are used.

Circuit 424 includes a section 435. Section 435 may be implemented as shown, for example as a group of nodes for proper routing of signals. In some embodiments, section 435 may be implemented otherwise, for example to include a receive/transmit switch that can route a signal, and so on.

Circuit 424 also includes a Rectifier and PMU (Power Management Unit) 441. Rectifier and PMU 441 may be implemented in any way known in the art, for harvesting raw RF energy received via antenna connections 432, 433. In some embodiments, Rectifier and PMU 441 may include more than one rectifier.

In operation, an RF wave received via antenna connections 432, 433 is received by Rectifier and PMU 441, which in turn generates power for the electrical circuits of IC 424. This is true for either or both reader-to-tag (R T) and tag-to-reader (T R) sessions, whether or not the received RF wave is modulated.

Circuit 424 additionally includes a demodulator 442. Demodulator 442 demodulates an RF signal received via antenna connections 432, 433. Demodulator 442 may be implemented in any way known in the art, for example including an attenuator stage, an amplifier stage, and so on.

Circuit 424 further includes a processing block 444. Processing block 444 receives the demodulated signal from demodulator 442, and may perform operations. In addition, it may generate an output signal for transmission.

Processing block 444 may be implemented in any way known in the art. For example, processing block 444 may include a number of components, such as a processor, memory, a decoder, an encoder, and so on.

Circuit 424 additionally includes a modulator 446. Modulator 446 modulates an output signal generated by processing block 444. The modulated signal is transmitted by driving antenna connections 432, 433, and therefore driving the load presented by the coupled antenna segment or segments. Modulator 446 may be implemented in any way known in the art, for example including a driver stage, amplifier stage, and so on.

In one embodiment, demodulator 442 and modulator 446 may be combined in a single transceiver circuit. In another embodiment, modulator 446 may include a backscatter transmitter or an active transmitter. In yet other embodiments, demodulator 442 and modulator 446 are part of processing block 444.

Circuit 424 additionally includes a memory 450, which stores data 452. Memory 450 is preferably implemented as a Nonvolatile Memory (NVM), which means that data 452 is retained even when circuit 424 does not have power, as is frequently the case for a passive RFID tag.

In terms of processing a signal, circuit 424 operates differently during a R T session and a T R session. The different operations are described below, in this case with circuit 424 representing an IC of an RFID tag.

Figure 5A:
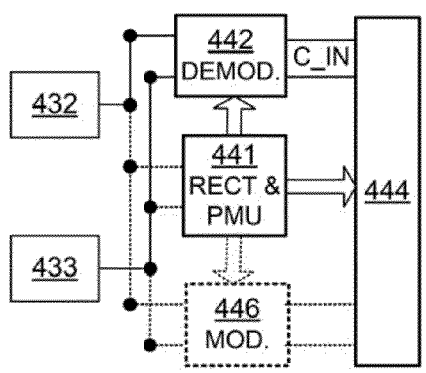
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R T session (receive mode of operation) during time interval 312 of FIG. 3. An RF wave is received by antenna connections 432, 433; a signal is demodulated by demodulator 442; and the demodulated signal is input to processing block 444 as C_IN. In one embodiment, C_IN may include a received stream of symbols.

Version 524-A shows as relatively obscured those components that do not play a part in processing a signal during a R T session. Indeed, Rectifier and PMU 441 may be active, but only in converting raw RF power. And modulator 446 generally does not transmit during a R T session. Modulator 446 typically does not interact with the received RF wave significantly, either because switching action in section 435 of FIG. 4 decouples the modulator 446 from the RF wave, or by designing modulator 446 to have a suitable impedance, and so on.

Whereas modulator 446 is typically inactive during a R T session, it need not be always the case. For example, during a R T session, modulator 446 could be active in other ways. For example, it could be adjusting its own parameters for operation in a future session.

Figure 5B:
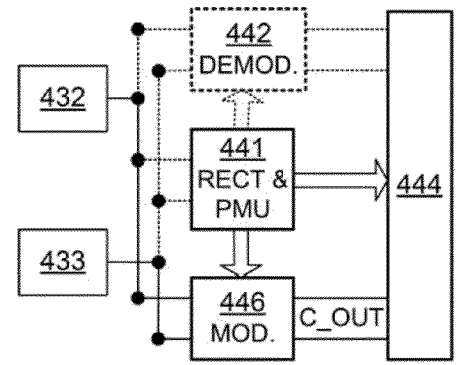

FIG. 5B shows version 524-B of components of circuit 424 of FIG. 4, further modified to emphasize a signal operation during a T R session during time interval 326 of FIG. 3. A signal is output from processing block 444 as C_OUT. In one embodiment, C_OUT may include a stream of symbols for transmission. C_OUT is then modulated by modulator 446, and output as an RF wave via antenna connections 432, 433.

Version 524-B shows as relatively obscured those components that do not play a part in processing a signal during a T R session. Indeed, Rectifier and PMU 441 may be active, but only in converting raw RF power. And demodulator 442 generally does not receive during a T R session. Demodulator 442 typically does not interact with the transmitted RF wave, either because switching action in section 435 decouples the demodulator 442 from the RF wave, or by designing demodulator 442 to have a suitable impedance, and so on.

Whereas demodulator 442 is typically inactive during a T R session, it need not be always the case. For example, during a T R session, demodulator 442 could be active in other ways. For example, it could be adjusting its own parameters for operation in a future session.

Figure 6:
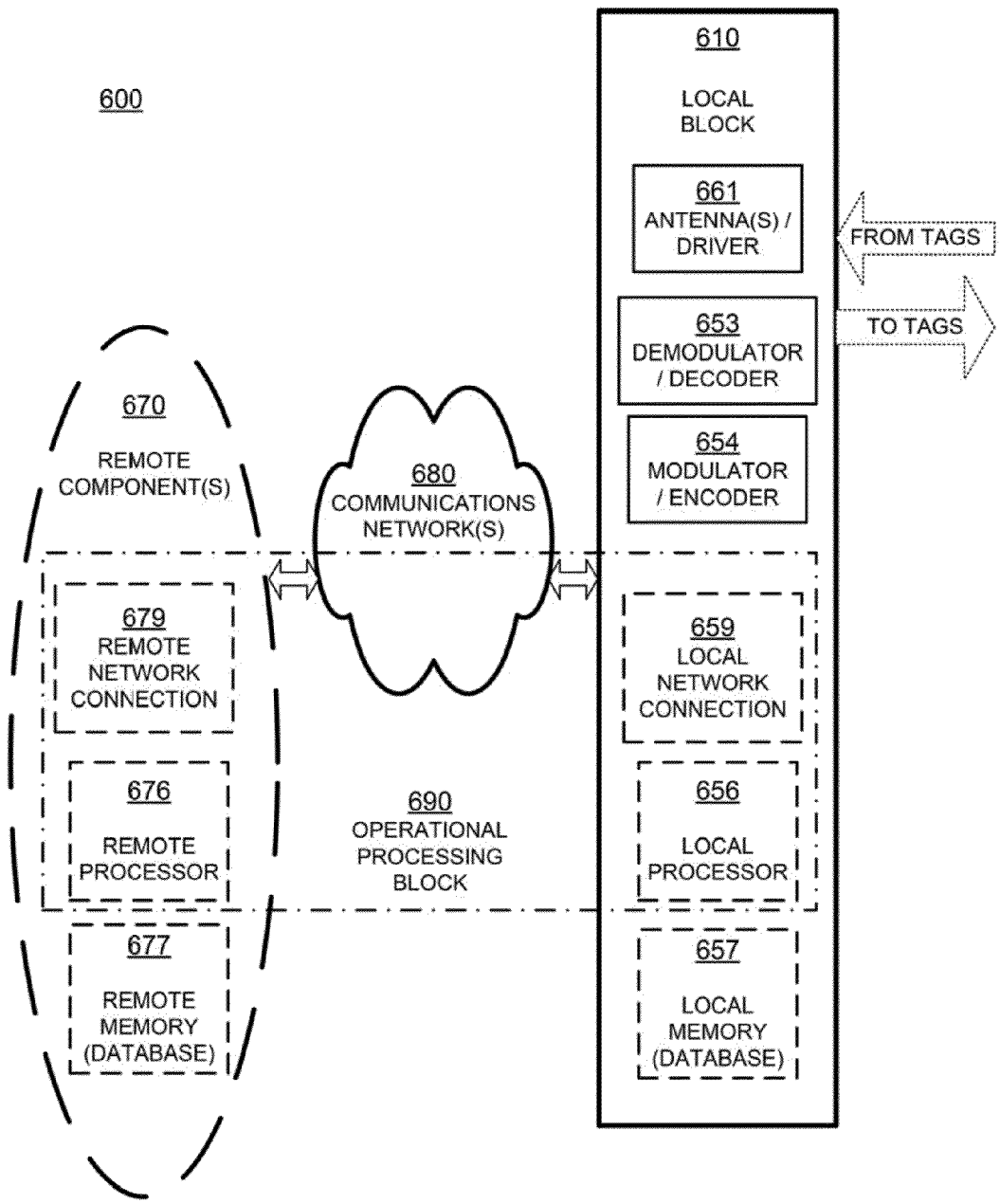
FIG. 6 is a block diagram showing a detail of an RFID reader system, such as the one shown in FIG. 1.

FIG. 6 is a block diagram of a whole RFID reader system 600 according to embodiments. System 600 includes a local block 610, and optionally remote components 670. Local block 610 and remote components 670 can be implemented in any number of ways. It will be recognized that reader 110 of FIG. 1 is the same as local block 610, if remote components 670 are not provided. Alternately, reader 110 can be implemented instead by system 600, of which only the local block 610 is shown in FIG. 1.

Local block 610 is responsible for communicating with tags. Local block 610 includes a block 661 of an antenna and a driver of the antenna for sending signals to and receiving signals from the tags. Some readers, like that shown in local block 610, contain a single antenna and driver. Some contain multiple antennas and drivers and a method to switch signals among them, including sometimes using different antennas for transmitting and for receiving. And some readers contain multiple antennas and drivers that can operate simultaneously. A demodulator/decoder block 653 demodulates and decodes RF waves received from the tags via antenna block 661. Modulator/encoder block 654 encodes and modulates an RF wave that is to be transmitted to the tags via antenna block 661.

Local block 610 additionally includes an optional local processor 656. Processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by processor 656. In some cases processor 656 may implement an encryption or authorization function; in some cases one or more of these functions can be distributed among other blocks such as encoding block 654, or may be entirely incorporated in another block.

Local block 610 additionally includes an optional local memory 657. Memory 657 may be implemented in any number of ways known in the art. Such ways include, by way of examples and not of limitation, nonvolatile memories (NVM), read-only memories (ROM), random access memories (RAM), any combination of one or more of these, and so on. These memories can be implemented separately from processor 656, or in a single chip with processor 656, with or without other components. Memory 657, if provided, can store programs for processor 656 to run, if needed.

In some embodiments, memory 657 stores data read from tags, or data to be written to tags, such as Electronic Product Codes (EPCs), Tag Identifiers (TIDs) and other data. Memory 657 can also include reference data that is to be compared to the EPC codes, instructions and/or rules for how to encode commands for the tags, modes for controlling antenna 661, and so on. In some of these embodiments, local memory 657 is provided as a database.

Some components of local block 610 may treat the data as analog, such as the antenna/driver block 661. Other components such as memory 657 may treat the data as digital. At some point there is a conversion between analog and digital. Based on where this conversion occurs, a whole reader may be characterized as "analog" or "digital", but most readers contain a mix of analog and digital functionality.

If remote components 670 are indeed provided, they are coupled to local block 610 via an electronic communications network 680. Network 680 can be a Local Area Network (LAN), a Metropolitan Area Network (MAN), a Wide Area Network (WAN), a network of networks such as the internet, or a mere local communication link, such as a USB, PCI, and so on. In turn, local block 610 then includes a local network connection 659 for communicating with network 680. Communications on the network can be secure, such as if they are encrypted or physically protected, or insecure, such as if they are not encrypted or otherwise protected.

There can be one or more remote component(s) 670. If more than one, they can be located at the same location, or in different locations. They can access each other and local block 610 via network 680, or via other similar networks, and so on. Accordingly, remote component(s) 670 can use respective remote network connections. Only one such remote network connection 679 is shown, which is similar to local network connection 659, etc.

Remote component(s) 670 can also include a remote processor 676. Processor 676 can be made in any way known in the art, such as was described with reference to local processor 656. Remote processor 676 may also implement an encryption function, similar to local processor 656.

Remote component(s) 670 can also include a remote memory 677. Memory 677 can be made in any way known in the art, such as was described with reference to local memory 657. Memory 677 may include a local database, and a different database of a Standards Organization, such as one that can reference EPCs. Remote memory 677 may also contain information associated with QT command, tag profiles, or the like, similar to local memory 657.

Of the above-described elements, it may be advantageous to consider a combination of these components, designated as operational processing block 690. Block 690 includes the following components: local processor 656, remote processor 676, local network connection 659, remote network connection 679, and by extension an applicable portion of network 680 that links remote network connection 679 with local network connection 659. The portion can be dynamically changeable, etc. In addition, block 690 can receive and decode RF waves received via antenna 661, and cause antenna 661 to transmit RF waves according to what it has processed.

Block 690 includes either local processor 656, or remote processor 676, or both. If both are provided, remote processor 676 can be made such that it operates in a way complementary with that of local processor 656. In fact, the two can cooperate. It will be appreciated that block 690, as defined this way, is in communication with both local memory 657 and remote memory 677, if both are present.

Accordingly, block 690 is location agnostic, in that its functions can be implemented either by local processor 656, or by remote processor 676, or by a combination of both. Some of these functions are preferably implemented by local processor 656, and some by remote processor 676. Block 690 accesses local memory 657, or remote memory 677, or both for storing and/or retrieving data.

Reader system 600 operates by block 690 generating communications for RFID tags. These communications are ultimately transmitted by antenna block 661, with modulator/encoder block 654 encoding and modulating the information on an RF wave. Then data is received from the tags via antenna block 661, demodulated and decoded by demodulator/decoder block 653, and processed by processing block 690.

Embodiments of an RFID reader system can be implemented as hardware, software, firmware, or any combination. It is advantageous to consider such a system as subdivided into components or modules. A person skilled in the art will recognize that some of these components or modules can be implemented as hardware, some as software, some as firmware, and some as a combination. An example of such a subdivision is now described, together with the RFID tag as an additional module.

Figure 7:
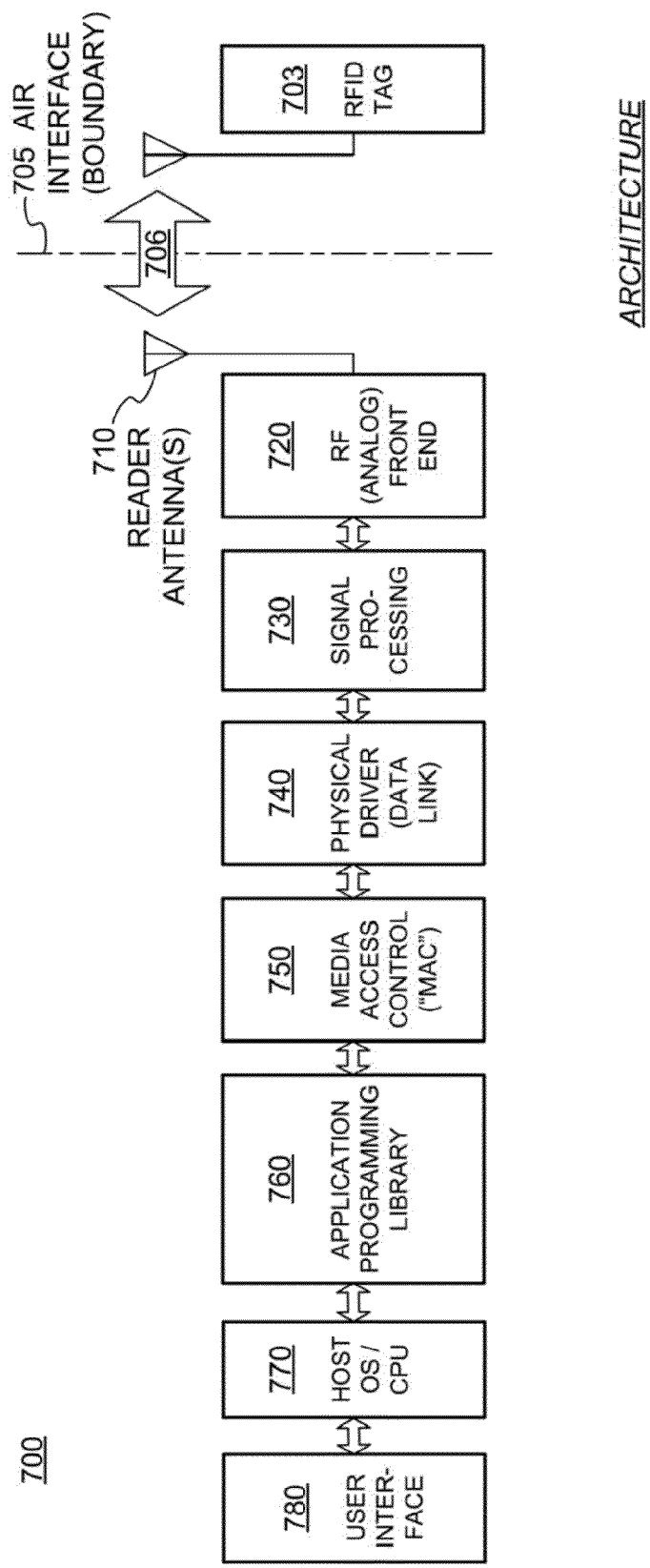
FIG. 7 is a block diagram illustrating an overall architecture of an RFID system according to embodiments

FIG. 7 is a block diagram illustrating an overall architecture of an RFID reader system 700 according to embodiments. It will be appreciated that system 700 is considered subdivided into modules or components. Each of these modules may be implemented by itself, or in combination with others. In addition, some of them may be present more than once. Other embodiments may be equivalently subdivided into different modules. These modules can be implemented in a variety of ways such as by discrete circuitry, integrated circuits, analog or digital signal processors, FPGAs, microprocessors, databases, interfaces, and so on. It will be recognized that some aspects are parallel with what was described previously.

An RFID tag 703 is considered here as a module by itself. Tag 703 conducts a wireless communication 706 with the remainder, via the air interface 705. It is noteworthy that air interface 705 is really only a boundary, in that signals or data that pass through it are not intended to be transformed from one thing to another. Specifications as to how readers and tags communicate with each other, for example the Gen 2 Specification, also properly characterize that boundary as an interface.

RFID reader system 700 includes one or more antennas 710, and an RF Front End 720, for interfacing with antenna(s) 710. These can be made as described above.

RFID reader system 700 also includes a Signal Processing module 730. In one embodiment, module 730 exchanges waveforms with Front End 720, such as I and Q waveform pairs.

RFID reader system 700 also includes a Physical Driver module 740, which is also known as Data Link. In one embodiment, module 740 exchanges bits with module 730. Data Link 740 can be the stage associated with framing of data.

RFID reader system 700 additionally includes a Media Access Control module 750, which is also known as MAC layer. In one embodiment, module 750 exchanges packets of bits with module 740. MAC layer 750 can make decisions for sharing the medium of wireless communication, which in this case is the air interface.

RFID reader system 700 moreover includes an Application Programming Library module 760. This module can include Application Programming Interfaces (APIs), other objects, etc.

All of these RFID reader system functionalities can be supported by one or more processors. One of these processors can be considered a host processor. Such a host processor might include a Host Operating System (OS) and/or Central Processing Unit (CPU) 770. In some embodiments, the processor is not considered as a separate module, but one that includes some of the above-mentioned modules of system 700. In some embodiments the one or more processors may perform operations associated with influencing a behavior of a tag based on the tag's public or private profile.

A user interface 780 may be coupled to library 760, for accessing the APIs. User interface 780 can be manual, automatic, or both. It can be supported by the host processor 770 mentioned above, or a separate processor, etc.

It will be observed that the modules of RFID reader system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, antenna(s) 710 receives wireless waves, which are in turn processed successively by the various modules in the chain. Processing can terminate in any one of the modules. In transmitting mode, waveform initiation can be in any one of the modules. Ultimately, signals are routed to antenna(s) 710 to be transmitted as wireless waves.

The architecture of RFID reader system 700 is presented for purposes of explanation, and not of limitation. Its particular subdivision into modules need not be followed for creating embodiments. Furthermore, the features of the present disclosure can be performed within a single one of the modules, or by a combination of them.

As mentioned previously, embodiments are directed to RFID readers causing RFID tags to switch between public and private profiles by means of a QT command. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, such as the processors described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions of a program made according to the embodiments. A storage medium according to the embodiments is a computer-readable medium, such as a memory, and is read by a processor of the type mentioned above. If a memory, it can be implemented in a number of ways, such as Read Only Memory (ROM), Random Access Memory (RAM), etc., some of which are volatile and some nonvolatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought of in terms of various interconnected distinct software modules.

Figure 8:
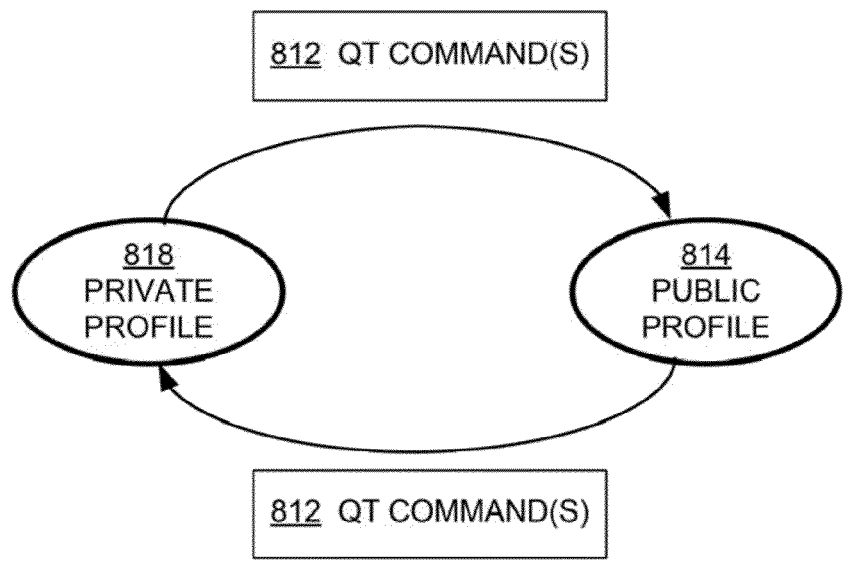
FIG. 8 illustrates how a tag can be switched between a public profile and a private profile, and vice versa, according to embodiments.

FIG. 8 illustrates how a tag can be switched between public and private profiles and back again, according to embodiments.

Normal RFID inventory operations permit a reader to determine, at least, the identity of a tag in its field-of-view unless the reader specifically and selectively takes action to exclude the tag from the inventorying. This ubiquitous inventory capability has the benefit of allowing a reader to identify all tags in its field of view, but has the disadvantage of permitting anyone to scan a tagged item and then locate it again later, raising privacy concerns and potentially providing useful information to thieves.

As mentioned previously, embodiments are directed to RFID readers with the ability to cause RFID tags to transition between public and private profiles using a QT command, and to tags that adjust their responses to readers depending on their currently exposed profile.

As shown in diagram 800, a tag according to some embodiments may be capable of being in one of two profiles: a public profile 814 and a private profile 818. In public profile 814 the tag may act more carefully because it is in "public" and so it may restrict the information it provides to a reader. In private profile 818 the tag may act less carefully and provide less restrictive information to the reader because it is in an environment where a rogue or illicit reader is not expected to be operating. In some embodiments the monikers "public" and "private" may simply denote two different profiles in which the tag exposes one set of memory contents in one profile and a different set of memory contents in the other profile. In some embodiments one or both of the profiles may hide the identifier of the item to which the tag is attached. In some embodiments the two profiles may expose totally different memory contents; in other embodiments there may be some overlap of the memory contents. In yet other embodiments that tag may expose more than two profiles.

The tag transitions between profiles in response to QT command(s) 812 received from a reader. The QT command that causes the transitioning may have fixed parameters and simply cause the tag to "toggle" between profiles, or it may contain variable parameters that tell the tag to perform one or more specific actions like toggling the profile, or it may be two or more different commands altogether. As an example, a QT command with variable parameters may contain a password, an indicator for which profile the tag should choose from a plurality of profiles, and an instruction to store the new profile into nonvolatile memory.

Figure 9:
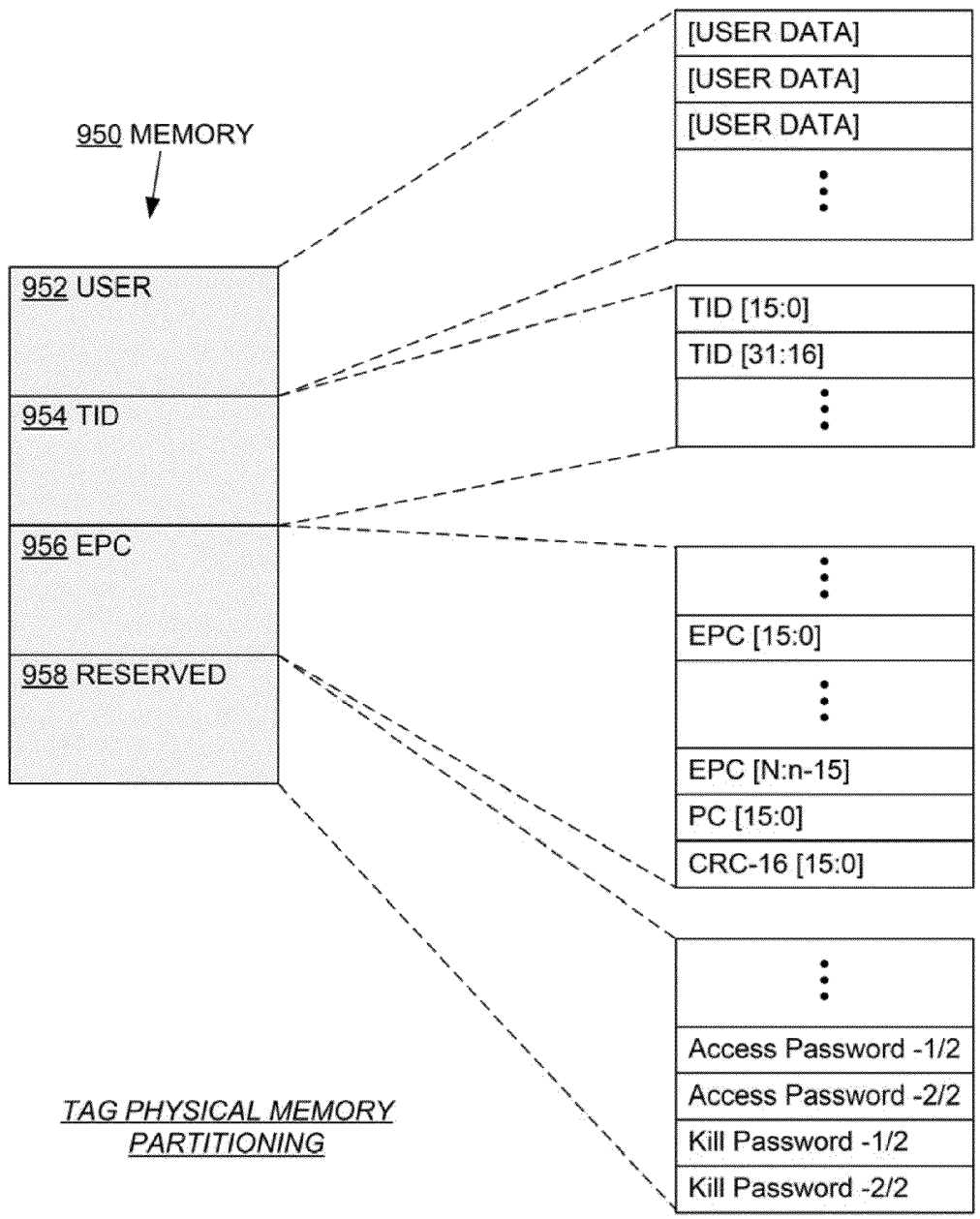
FIG. 9 is a diagram illustrating how a tag physical memory can be partitioned and organized.

FIG. 9 is a diagram 900 illustrating how a tag physical memory such as the memory shown in FIG. 4 can be partitioned and organized to store data.

Tag memory 950 may be partitioned into banks that include user data in partition 952, an identifier for the tag itself (a TID) in partition 954, an identifier for the item to which the tag is attached (often an electronic product code—an EPC) in partition 956, and information such as passwords that are reserved for the tag itself in partition 958. In other embodiments, memory 950 may be partitioned in other ways with fewer or more partitions, or not partitioned at all. Data may be stored in the memory during tag manufacturing or during an operation by processing block 444 of FIG. 4, typically in response to a command received from a reader. Processing block 444 may also access the stored information.

Information stored in memory 950 may be used in tag operations such as inventory. For example, EPC partition 956 can be arranged to store a CRC-16 (cyclic redundancy check) for the EPC, protocol control (PC) information that identifies parameters of the EPC, and the EPC itself. The tag may provide this information to a reader in response to an inventory command or commands.

Figure 10A:
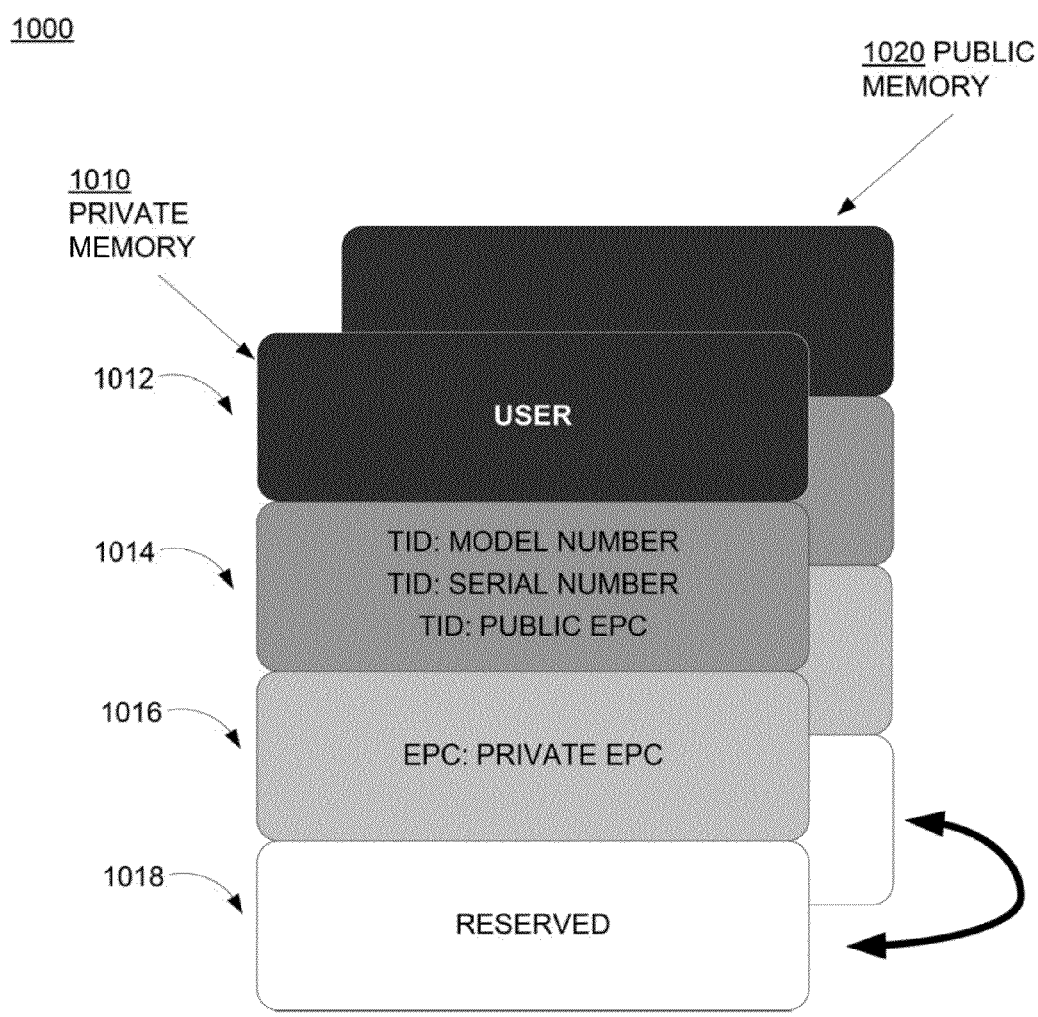
FIGS. 10A and 10B illustrate example tag memory contents in private and public profiles.
Figure 10B:
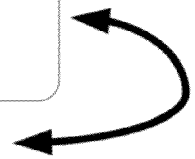

FIGS. 10A and 10B illustrate example tag memory contents in exemplary private and public profiles.

According to embodiments, an RFID tag may have two or more profiles, each implementing a different memory configuration, in a single IC. An RFID tag employs a single profile and a corresponding single memory configuration at a time. The RFID tag can switch between these profiles, typically when commanded to do so by a reader. For reasons of clarity this detailed description highlights two profiles, labeled "public" and "private", but more than two profiles and different labeling are possible. FIG. 10A shows an example memory configuration 1010 for the private profile. This memory configuration is exemplary, and other memory configurations are possible. When in the private profile a tag employs private memory 1010 which includes user memory 1012, TID memory 1014, EPC memory 1016, and reserved memory 1018. TID memory 1014 is partitioned into a model number, serial number, and public EPC.

FIG. 10B shows an example memory configuration 1020 for the public profile. This memory configuration is exemplary, and other memory configurations are possible. When in the public profile a tag employs public memory 1020 which includes user memory 1022 which is not available and therefore unreadable in the public profile, TID memory 1024, EPC memory 1026, and reserved memory 1028. Notice, by comparison with private memory 1010, that public memory 1020 does not expose user memory at all, exposes only the tag model number in TID memory 1024, and exposes a public EPC rather than a private EPC in EPC memory 1026.

Figure 11:
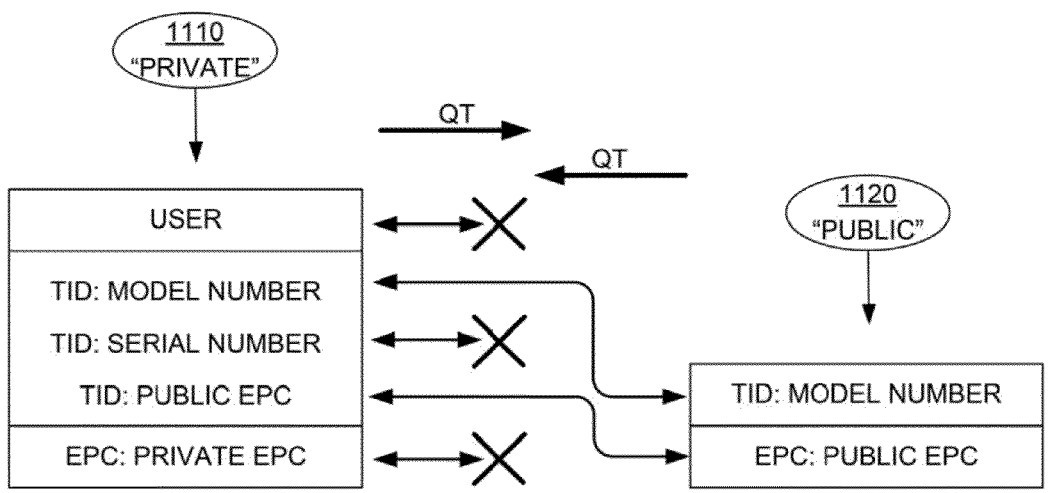
FIG. 11 illustrates switching the exposed tag memory from private to public, and vice versa.

FIG. 11 illustrates switching the exposed tag memory from private to public, and vice versa, according to embodiments.

Diagram 1100 shows the transition between private profile 1110 and public profile 1120, where different portions of tag memory are hidden from or visible to a reader. In the private profile the tag exposes user memory; TID memory containing a tag model number, tag serial number, and a public EPC; and EPC memory containing a private EPC. Diagram 1100 does not explicitly show reserved memory 1018 of FIG. 10A because, although reserved memory may be present in the tag, it is typically not exposed for reading by a reader. Portions of private memory 1100 may be writeable by a reader, such as the public EPC. In some applications a reader writes a value into this public EPC memory location and then "publicizes" the tag using a QT command. Readers are free to encode as little or as much information into this public EPC field as they choose (including no information at all) before publicizing the tag.

One usage model for private and public profiles includes a tag containing a private EPC in private EPC memory that indicates the item to which the tag is attached. At point-of-sale a reader may write sale information, such as a store code or a sale code, into the public EPC location located in TID memory, then issue a QT command to switch the tag's exposed memory profile from private to public. Once switched, the tag conceals its user memory, TID serial number, and private EPC. Instead the tag exposes its public EPC in public EPC memory, remapped from the prior location in TID memory. During inventory, the tag will now send this public EPC to a reader, which may contain the sale code but typically not the EPC of the item to which the tag is attached. Notice that in this example the tag's public memory is a subset of the tag's private memory—the tag remaps its model number and public EPC from the private-state TID memory bank to a model number and public EPC located in the public-state TID and public-state EPC memory banks, respectively. Of course, the public memory need not be a subset of the private memory, but could be totally different, as could the choice of memory locations to transfer from private state to public. Finally, as shown in FIG. 11, in some embodiments the state switching is reversible, allowing the reader to instruct the tag to switch from exposing its private memory back again to exposing its public memory.

Figure 12:
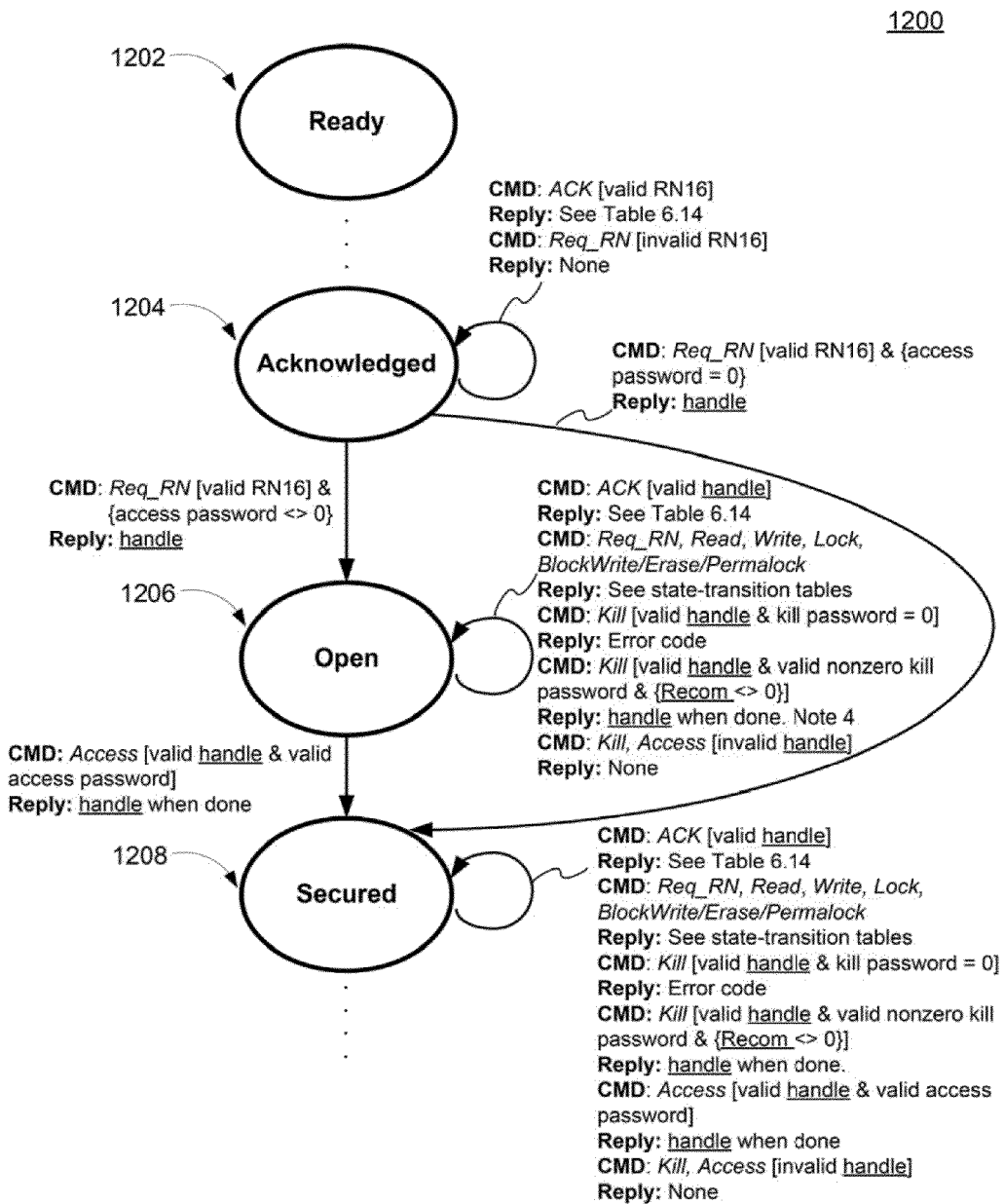
FIG. 12 is a tag state diagram according to the Gen2 Specification.

FIG. 12 is a tag state diagram according to the Gen2 Specification.

Diagram 1200 illustrates tag states according to the Gen2 Specification. Diagram 1200 also illustrates commands that transition a tag from one state to another, as well as the corresponding tag replies. Note that diagram 1200 is a subset of the actual state diagram in the Gen2 Specification, omitting some tag states that are not necessary for an understanding of the present invention. An energized tag enters the state diagram in the Ready state 1202. After being inventoried by a reader the tag is in the Acknowledged state 1204. If a tag in the Acknowledged state receives a Req_RN command then it may transition to either the Open state 1206 or the Secured state 1208. If the tag's access password is zero then the tag transitions directly from the Acknowledged state to the Secured state. If the tag's access password is non-zero then the tag transitions from the Acknowledged state to the Open state. A tag in the Open state transitions to the Secured state upon receiving a valid access password from a reader. The Open state can be viewed as a gateway to the Secured state for tags that implement access-password-protected security.

A tag in the Secured state 1208 is allowed to implement some commands and functions that are disallowed in the Open state 1206. For example, according to the Gen2 Specification, a tag in the Secured state is allowed to implement a Lock command but a tag in the Open state is not. In a similar vein, the QT command can be allowed from the Secured state but not from the Open state. Of course, it is possible to construct a QT command that is allowed from both the Secured and Open states, or even from other states such as the Acknowledged state, but if a tag is only allowed to implement a QT command from the Secured state, and the tag has a nonzero access password (i.e. the tag implements access-password-protected security), then the tag will only execute the QT command after the reader has sent the proper access password to the tag. By this means the QT command can be password protected in accordance with the Gen2 Specification. Of course, it is possible to construct a QT command that is itself protected by a password, or by another security means, but using the security mechanisms that are an integral part of the Gen2 Specification allows for a simple QT command implementation.

There are other ways to restrict a tag's ability to execute a QT command. For example, a tag could require that a reader be physically close to the tag (for example, within 30 cm of the tag) before executing a QT command. The tag might enforce such a short-range restriction by measuring the power it receives from the reader and only executing a QT command if the RF power level exceeds a threshold. Because one purpose for a QT feature is protecting consumer privacy, restricting QT to nearby readers means that the holder of the tag will be able to see the reader and determine if the operator is a "bad guy" executing the command. Protecting unauthorized readers from executing a QT command by a short-range restriction can be separate from, or in addition to, access-password-protected security. For example, a tag could be designed to only implement the QT command from the Secured state. If the tag has a zero-valued access password and enters the Secured state 1208 directly from the Acknowledged state 1204, the tag could still require that the reader be close to the tag before executing a QT command. If the tag has a nonzero access password and enters the Secured state after receiving the proper access password, the tag could again refuse to execute the QT command unless the reader is close to the tag. Alternatively, the tag could be designed to allow the QT command from the Open state, with or without short-range protection, or even from other states like the Acknowledged state. Furthermore, other protection mechanisms are possible, such as the tag requiring that the reader physically contact the tag before executing the QT command, or the tag requiring a valid "PIN" code before it executes the QT command. These protection mechanisms can be layered on top of each other, or implemented solely, and can be allowed from one or more states of the Gen2 Specification.

As a specific example, assume a tag with a short-range behavior that reduces the tag's sensitivity (i.e. requires a nearby reader) before entering the Open or Secured states. The tag may have normal sensitivity during inventory. However, prior to transitioning from Acknowledged to the Open or Secured states the tag checks the RF power level. If the power level is above the short-range threshold then the tag enters the Open or Secured state. Otherwise, the tag returns to the Ready state. The tag can still be inventoried at long range. However, if the tag is designed to only execute a QT command when in the Secured state, this power check effectively prevents the tag from accepting a QT command at long range. Said another way, a reader is always able to read the tag's currently exposed EPC (public or private, as appropriate for the current profile) at maximum range. However, when the tag's short-range mechanism is enabled, a reader at long range that tries to instruct the tag to enter the Open or Secured state and switch the tag's profile (for example, from public to private to read the tag's user memory) will see the tag drop out of its dialog with the reader and return to the Ready state. The short-range mechanism ensures that protected information in the tag is not readable unless the reader is close to the tag.

In summary, a QT-enabled tag can use physical protection (e.g. short-range), logical protection (e.g. access password), or both to prevent unauthorized access, even while allowing readers to inventory the tag and read its EPC (public or private, as appropriate for the current profile) at maximum range FIG. 13 illustrates an example QT command that a reader might send to a tag. Note that the command 1300 of FIG. 13 is an example only—a QT command for transitioning an RFID tag between two or more profiles may have a different length and include more or less parameters than the example shown in FIG. 13.

Example QT command 1300 may be 68 bits long and include a 16-bit command code 1302, a read/write bit 1303, a persistence bit 1304, two RFU bits 1305, a 16-bit payload 1306, a 16 bit handle 1307, and a 16-bit cyclic redundancy check (CRC) 1308.

The 16-bit command code 1302 tells a tag that the incoming command is a QT command. The read/write bit 1303 indicates whether a reader wants to read QT control data from the tag or write QT control data to the tag. Read/write=0 means read; read/write=1 means write. If read/write=1 then persistence bit 1304 tells the tag whether to write QT control data to volatile or nonvolatile memory. Persistence=0 means volatile memory; persistence=1 means nonvolatile memory.

Persistence bit 1304 offers an additional security mechanism. Consider an authorized reader that wants to temporarily switch a tag from the public state to private, for example to read from user memory, but then inadvertently leaves the tag in the private state. The tag could later compromise its private data. To prevent such a security breach, the persistence bit 1304 of FIG. 13 allows a reader to temporarily switch the tag's state, but to store the information about the state change in volatile memory. When the tag loses power this volatile memory bit will "forget" its setting and the tag will automatically revert to its public profile.

RFU field 1305 is ignored by the tag. RFU stands for "reserved for future use" and provides for command extensibility for the future. Payload 1306 carries control data for the QT functionality. A tag ignores these bits when read/write=0 (i.e. read), but implements them when read/write=1 (i.e. write). These bits tell a tag whether to use the short-range security mechanism discussed above, whether the tag should be in the public profile or the private profile, and allows other QT functionality that might be required. RN (random number) 1307 contains a handle that a reader uses to indicate which tag it is communicating with. In some embodiments a tag ignores the command if the handle indicates that the reader is communicating with a different tag. Finally, CRC 1308 contains a CRC that a tag uses to ensure that the QT command has not undergone bit errors during transmission.

Figure 14A:
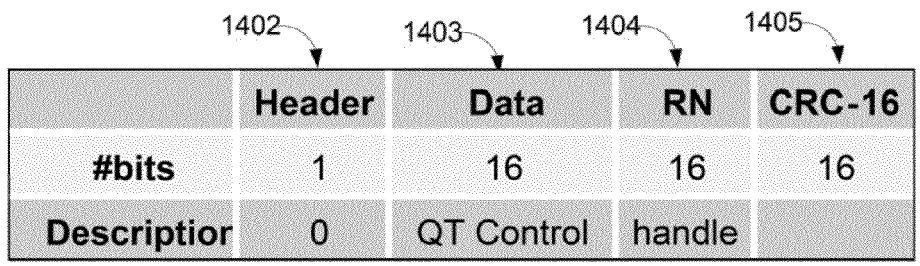
FIGS. 14A and 14B illustrate example tag responses to QT read and QT write commands.
Figure 14B:
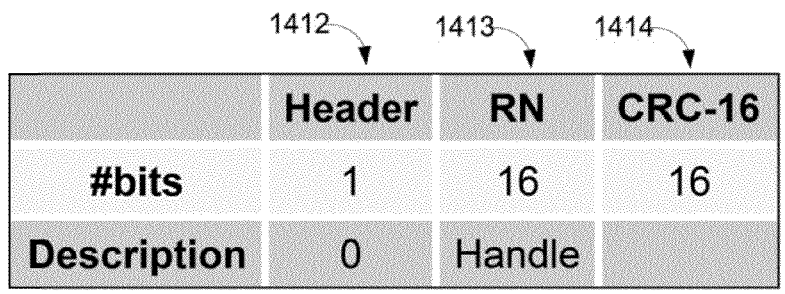

FIGS. 14A and 14B illustrate example tag responses to a QT command. FIG. 14A shows an example response to a QT command with read/write=0 (read). FIG. 14B shows an example response to a QT command with read/write=1 (write).

The tag response 1400 in FIG. 14A to a QT read command may include a header bit 1402 whose value is set to zero, 16-bit data 1403 that tells the reader the tag's current QT control data, a 16-bit RN 1404 which is the handle that the reader sent to the tag, and 16-bit CRC 1405 to ensure that the tag's reply has not undergone bit errors during transmission.

The tag response 1410 in FIG. 14B to a QT write command may include a header bit 1412 whose value is set to zero, a 16-bit RN 1413 which is the handle that the reader sent to the tag, and 16-bit CRC 1414 to ensure that the tag's reply has not undergone bit errors during transmission. A reader should not presume that a tag has properly executed a QT Write command until and unless it receives the response shown in FIG. 14B.

Embodiments also include methods. Some are methods of operation of an RFID reader or an RFID reader system. Others are methods for controlling an RFID reader or an RFID reader system. Yet others are methods for controlling one or more RFID tags. These methods can be implemented in any number of ways, including the ways described in this document. One such way is by machine operations, of devices of the type described in this document.

Another optional way of implementing these methods is for one or more of the individual operations of the methods to be performed in conjunction with one or more human operators performing some of them. These operators need not be collocated with each other, but each can be with a machine that performs a portion of a program or operation.

Figure 15A:
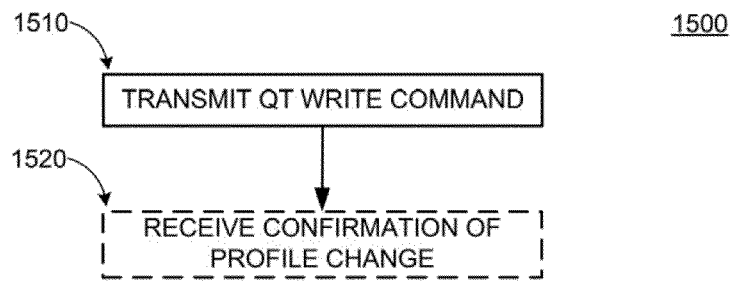
FIG. 15A is a flowchart for a process of an RFID reader controlling an RFID tag's behavior via a QT command according to embodiments.

FIG. 15A is a flowchart for a process of an RFID reader controlling an RFID tag's behavior via a QT write command according to embodiments.

Process 1500 begins at operation 1510, in which a reader transmits a QT write command to a tag. The QT command may instruct the tag to transition from a public profile to a private profile, or vice versa. At optional operation 1520 the reader may receive a confirmation from the tag indicating that the tag has successfully performed the transition. This confirmation may be the tag response of FIG. 14B.

Figure 15B:
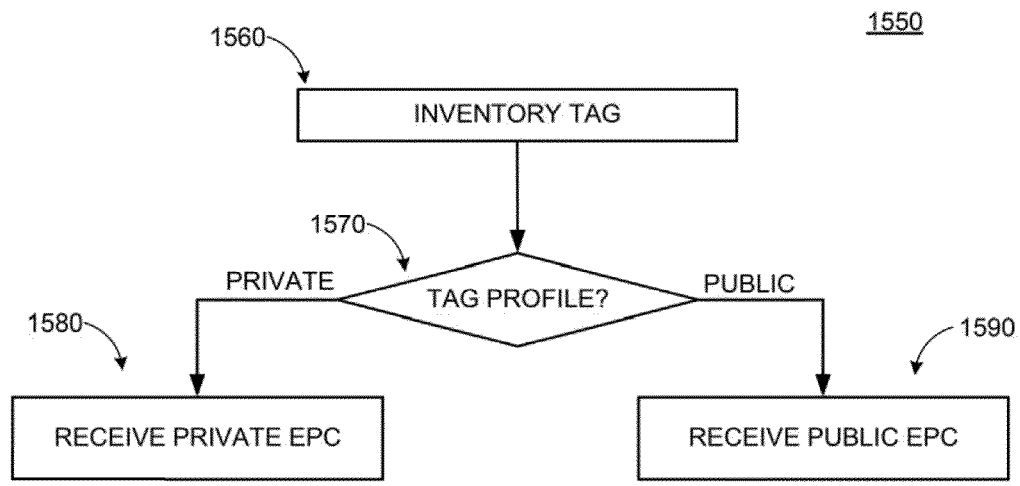
FIG. 15B is a flowchart for a process of an RFID reader inventorying an RFID tag that implements public and private profiles according to embodiments.

FIG. 15B is a flowchart for a process of an RFID reader inventorying an RFID tag that implements public and private profiles according to embodiments.

Process 1550 begins at operation 1560, in which a reader inventories a tag that implements public and private profiles. The tag's response to the inventory process is determined by the tag's profile at decision operation 1570. If the tag is in the private profile, it replies to the reader at operation 1580 with its private EPC. If the tag is in the public profile, it replies to the reader at operation 1590 with its public EPC.

The operations described in processes 1500 and 1550 are for illustration purposes only. A reader according to embodiments may cause a tag to transition between private and public profiles using a QT command employing additional or fewer operations, or the reader may choose to read the tag's QT profile information rather than writing the tag profile information, or the reader may implement or be required by the tag to implement one or more security operations such as a password exchange or moving to short range, or the commands may occur in different orders, or there may be more than two profiles, or other differences or enhancements in the commands or replies or ordering, using the principles described herein.

The above-described QT features can be implemented by a so-called utility of an RFID system. For example, a utility can include one or more of the above-described components, operational processing blocks, an article of manufacture, etc. The invention further provides interfacing, to expose a functionality of this utility to an agent, as is described in more detail below.

FIG. 16 is a block diagram illustrating an architecture 1600 for an interface converter according to embodiments. Architecture 1600 includes a utility 1640, which is a mechanism for performing some or all of the reader and tag features described above. More particularly, utility 1640 may cause a tag to switch between public and private profiles thereby influencing the information the tag transmits to a querying reader.

Architecture 1600 additionally includes an interface converter 1650 and an agent 1660. Embodiments also include methods of operation of interface converter 1650. Interface converter 1650 enables agent 1660 to control utility 1640. Interface converter 1650 is so named because it performs a conversion, a change, as will be described in more detail below. Agent 1660, interface converter 1650, and utility 1640 can be implemented in any way known in the art. For example, each can be implemented in hardware, middleware, firmware, software, or any combination thereof. In some embodiments, agent 1660 is a human.

Between agent 1660, interface converter 1650, and utility 1640 there are respective boundaries 1655, 1645. Boundaries 1655, 1645 are properly called interfaces, in that they are pure boundaries, as is the above described air interface.

In addition, it is a sometimes informal usage to call the space between boundaries 1655 and 1645, which includes interface converter 1650, an "interface" 1656. Further, it is common to designate this space with a double arrow as shown, with an understanding that operations take place within the arrow. Although "interface" 1656 is located at a boundary between agent 1660 and utility 1640, it is not itself a pure boundary. Regardless, the usage of the term "interface" is so common for interface converter 1650 that this document sometimes also refers to it as an interface. It is clear that embodiments of such an "interface" 1656 can be included in this invention, if they include an interface converter that converts or alters one type of transmission or data to another, as will be seen below.

Agent 1660 can be one or more layers in an architecture. For example, agent 1660 can be something that a programmer programs to. In alternative embodiments, where agent 1660 is a human, interface converter 1650 can include a screen, a keyboard, etc. An example is now described.

FIG. 17 is a sample screenshot 1750 of an interface converter, such as the interface converter of FIG. 16. Screenshot 1750 can be that of a computer screen for a human agent, according to an embodiment. What is displayed in screenshot 1750 exposes the functionality of a utility, such as utility 1640. Inputs by the user via a keyboard, a mouse, etc., can ultimately control utility 1640. Accordingly, such inputs are received in the context of screenshot 1750. These inputs are determined from what is needed for controlling and operating utility 1640. An advantage of such interfacing is that agent 1660 can prepare RFID applications at a higher level, without needing to know how to control lower level RFID operations. Such lower level RFID operations can be as described in the Gen 2 Spec, in other lower level protocols, etc. Utility 1640 can be controlled in any number of ways. Some such ways are now described.

Returning to FIG. 16, one way interface converter 1650 can be implemented is as a software Application Programming Interface (API). This API can control or provide inputs to an underlying software library, and so on.

Communications can be made between agent 1660, interface converter 1650, and utility 1640. Such communications can be as input or can be converted, using appropriate protocols, etc. What is communicated can encode commands, data, etc. Such communications can include any one or a combination of the following: a high-down communication HDNT from agent 1660 to interface converter 1650; a low-down communication LDNT from interface converter 1650 to utility 1640; a low-up communication LUPT from utility 1640 to interface converter 1650; and a high-up communication HUPT from interface converter 1650 to agent 1660. These communications can be spontaneous, or in response to another communication, or in response to an input or an interrupt, etc.

Commands are more usually included in communications HDNT and LDNT, for ultimately controlling utility 1640. Controlling can be in a number of manners. One such manner can be to install utility 1640, or just a feature of it. Such installing can be by spawning, downloading, etc. Other such manners can be to configure, enable, disable, or operate utility 1640, or just a feature of it. These commands can be standalone, or can carry parameters, such as data, confidential information, etc. In some embodiments interface converter 1650 can convert these commands to a format suitable for utility 1640.

Data are more usually included in communications HUPT and LUPT. The data can inform as to success or failure of executing an operation. The data can also include tag data, which can be both codes read from tags (including confidential information) and data about reading from or writing to tags (such as time stamps, confirmation replies, etc.). In some embodiments interface converter 1650 can convert the data to a format suitable for agent 1660, including in some cases aggregating, filtering, merging, or otherwise altering the format or utility of the data.

It should be noted that what passes across a single pure boundary is unchanged (by the mere definition of what is a pure boundary). But what passes through interface converter 1650 can be changed or not. More particularly, high-down communication HDNT can be being encoded similarly to, or differently from, low-down communication LDNT. In addition, low-up communication LUPT can be encoded similarly to, or differently from, high-up communication HUPT. When different, the difference can be attributed to interface converter 1650, which performs a suitable change, or conversion, of one communication to another. The change, or conversion, performed by interface converter 1650 is for exposing the functionality of utility 1640 to agent 1660, and vice versa. In some embodiments, a command is converted, but a parameter is passed along without being converted. Plus, what is not converted at one module may be converted at another. Such modules taken together can also form an interface converter according to embodiments.

Figure 18:
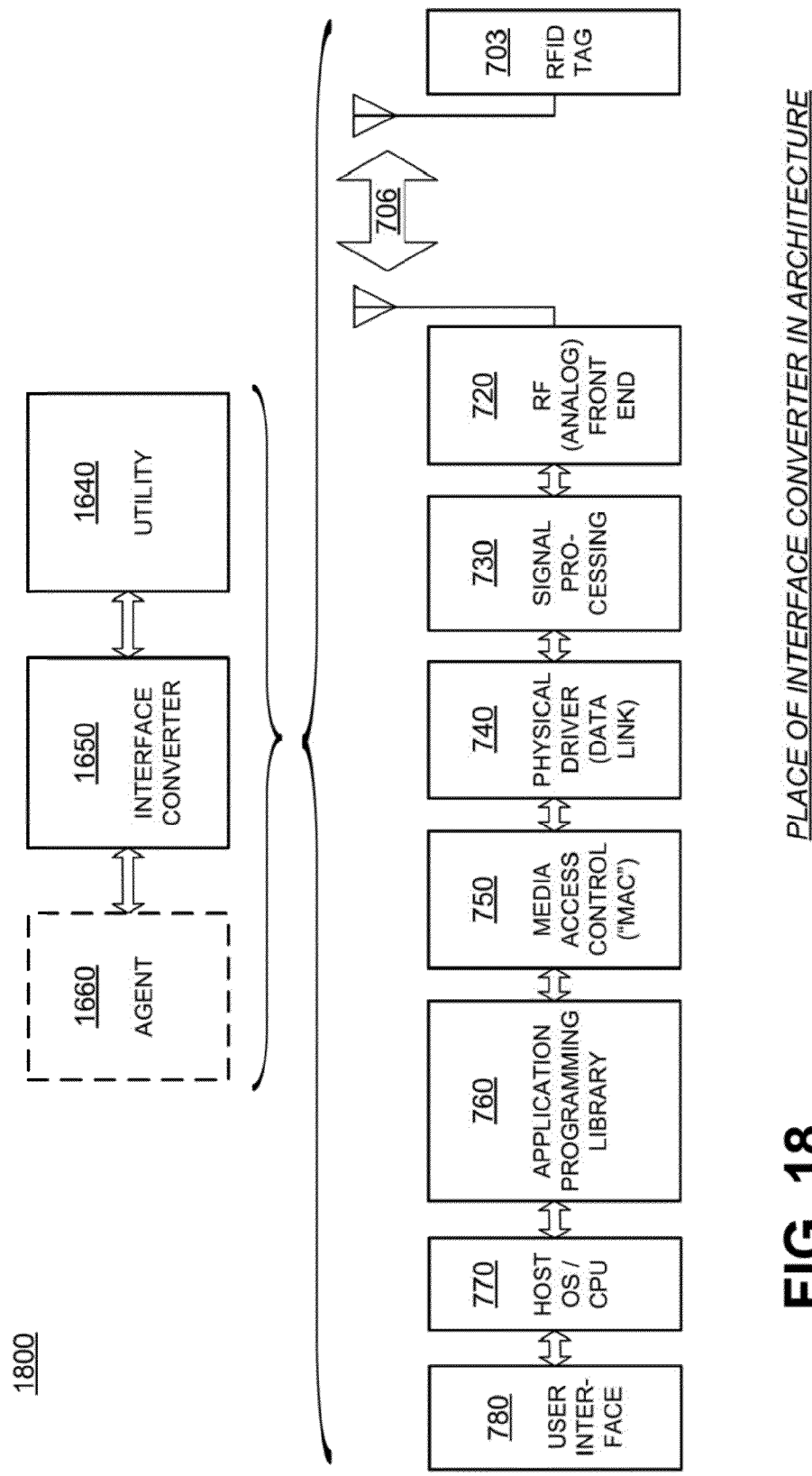
FIG. 18 is a diagram showing a correspondence for how components of FIG. 16 can be implemented by those of FIG. 7, in embodiments where the interface converter is implemented by an RFID system.

Agent 1660, interface converter 1650, and utility 1640 can be implemented as part of a reader, or in a different device, or distributed across devices such as an RFID system. FIG. 18 shows a diagram 1800 of an RFID system where agent 1660, interface converter 1650, and utility 1640 can be implemented as reader modules and a tag. Diagram 1800 shows a correspondence for how the components of FIG. 16 can be implemented by those of FIG. 7, in embodiments where the interface converter is implemented within the RFID system.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples (e.g. tags and readers according to embodiments) may be implemented individually and/or collectively by a wide range of hardware, software, firmware, or virtually any combination thereof. Those skilled in the art will recognize that some aspects of the RFID tag embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the means of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, command structures, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having"

should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID) reader integrated circuit (IC) comprising:
    a communication module for facilitating wireless communication with a plurality of RFID tags; and
    a processor configured to:
        transmit a first command to at least one of the plurality of tags, the first command causing at least one tag to transition between a private profile and a public profile, wherein the first command includes at least one from a set of: a read/write field, a persistence field, a payload field, and an RN field, and wherein the at least one RFID tag is adapted to:
            when inventoried in the private profile, reply to the reader IC with a first identifier; and
            when inventoried in the public profile,
                reply to the reader IC with a second identifier,
                retain the first identifier,
                not reply with the first identifier as long as a tag is in the public profile, wherein the tag is configurable to subsequently return to the private profile and reply with the first identifier; and
            employ a first received sensitivity to the first command and a second received sensitivity to a second command, wherein the first sensitivity is greater than the second sensitivity; and
        transmit the second command causing the plurality of RFID tags to return to the private profile.

2. The RFID reader IC of claim 1, wherein the first and second commands employ a same command code.

3. The RFID reader IC of claim 1, wherein the at least one RFID tag temporarily transitions from one of the private profile and the public profile to another one of the private profile and the public profile, and reverts back upon losing power.

4. The RFID reader IC of claim 1, wherein the at least one RFID tag is configurable to transition between the private and public profiles only after receiving and verifying a password from the reader IC and to not transition otherwise.

5. The RFID reader IC of claim 1, wherein the first command further causes the tag to report its current profile to the reader IC.

6. The RFID reader IC of claim 1, wherein the first command further causes the tag to transmit a subportion of its memory contents to the reader IC, the subportion indicated by the first command.

7. The RFID reader IC of claim 1, wherein a plurality of contents of the read/write field cause the at least one RFID tag to perform one of:
    read control data from tag memory; and
    write control data to tag memory.

8. A method for a Radio Frequency Identification (RFID) reader integrated circuit (IC) to communicate with a plurality of RFID tags, the method comprising:
    transmitting from a reader IC a command, the command causing at least one of the plurality of tags to transition between a private profile and a public profile, wherein the command includes at least one from a set of: a read/write field, a persistence field, a payload field, and an RN field;
    receiving a reply from the at least one tag with a first identifier when the tag is inventoried in the private profile;
    receiving a reply from the at least one tag with a second identifier when the tag is inventoried in the public profile, wherein the at least one RFID tag is adapted to
        retain the first identifier when inventoried in the public profile;
        not reply to the reader IC with the first identifier as long as the at least one tag is in the public profile, wherein the at least one tag is configurable to subsequently return to the private profile and reply with the first identifier; and
        employ a first received sensitivity to the command at the tag in the public profile and employ a second received sensitivity to the command at the tag in the public profile, wherein the second sensitivity is lower than the first sensitivity; and transmitting a subsequent command and causing the at least one RFID tag to return to the private profile in response to the subsequent one of the command.

9. The method of claim 8, wherein the tag is configurable to transition between the private and public profiles only after receiving a password from the reader IC that matches another password stored on the at least one RFID tag.

10. The method of claim 8, further comprising causing the at least one RFID tag to perform at least one from a set of:

transitioning from one of the private profile and the public profile to another one of the private profile and the public profile;

reporting its current profile to the reader IC;

transmitting a selected portion of tag memory contents; and reverting back upon losing power.

11. The method of claim 10, wherein a portion of the tag memory contents is indicated by the command.

12. The method of claim 8, wherein a plurality of contents of the read/write field cause the at least one RFID tag to perform one of:

reading control data from tag memory; and writing control data to tag memory.

13. The method of claim 12, wherein a plurality of contents of the persistence field cause the at least one RFID tag to write the control data to one of: a tag volatile memory and a tag nonvolatile memory.

14. The method of claim 8, wherein a plurality of contents of the RN field cause the at least one RFID tag to ignore the command if the command lacks a valid handle.

15. The method of claim 8, wherein a plurality of contents of the payload field cause the at least one RFID tag to perform at least one from a set of:

reducing tag sensitivity to the command; and switching a tag profile.

16. The method of claim 8, wherein the command further indicates a tag memory portion to be rendered unreadable when the at least one RFID tag is in the public profile.

17. The method of claim 8, wherein the command includes a 1 bit read/write field, a 1 bit persistence field, a 16 bit payload field, and a 16 bit RN field.

18. A plurality of Radio Frequency Identification (RFID) tag ICs communicating with a reader and implemented in a system being capable of causing at least one of the tag ICs to transition between two profiles, the system comprising:

a processor configured to transmit a high-down transmission to control a utility in a first manner for transmitting one of a first comment and a second command, the commands including a persistence field to a plurality of tag ICs, the first manner including one of: installing, enabling, configuring, operating, and disabling the utility, wherein command causes the at least one of the tag ICs to transition into one of a public profile and a private profile, wherein an at least one RFID tag IC is adapted to:

when inventoried in the private profile, reply to the reader with a first identifier; and when inventoried in the public profile, reply to the reader with a second identifier, retain the first identifier, and not reply with the first identifier as long as the tag IC is in the public profile, wherein the tag IC is configurable to subsequently return to the private profile and reply with the first identifier;

responsive to a plurality of contents of the persistence field, the tag IC writes a control data to one of: a tag IC volatile memory and a tag IC nonvolatile memory; and responsive to the high-down transmission, transmitting a low-down transmission to control the utility in the first manner, the low-down transmission being encoded differently than a high-down transmission at least in part, wherein at least one of a first and second commands includes a payload field causing the tag IC to reduce its sensitivity to at least one of the first and second commands.

19. The RFID tag IC system of claim 18, wherein a low-up transmission is received responsive to transmitting the low-down transmission, and responsive to receiving the low-up transmission a high-up transmission is transmitted.

20. The RFID tag IC system of claim 18, wherein a plurality of contents of the payload field further cause the tag IC to switch its current profile.

21. The RFID tag IC system of claim 18, wherein the tag IC ignores the first command if a plurality of contents of an RN field are not a valid handle.

22. The RFID tag IC system of claim 18, wherein the first command includes a 1 bit read/write field, a 1 bit persistence field, a 16 bit payload field, and a 16 bit RN field.

23. The RFID tag IC system of claim 18, wherein the first command further indicates a tag IC memory portion to be rendered unreadable when the tag IC is in the public profile.

24. The RFID tag IC system of claim 18, wherein the first command causes the at least one tag IC to transition between the private and public profiles only after receiving a password from the reader that matches another password stored on the tag IC.

* * * * *